United States Patent Office 3,398,583
Patented Aug. 27, 1968

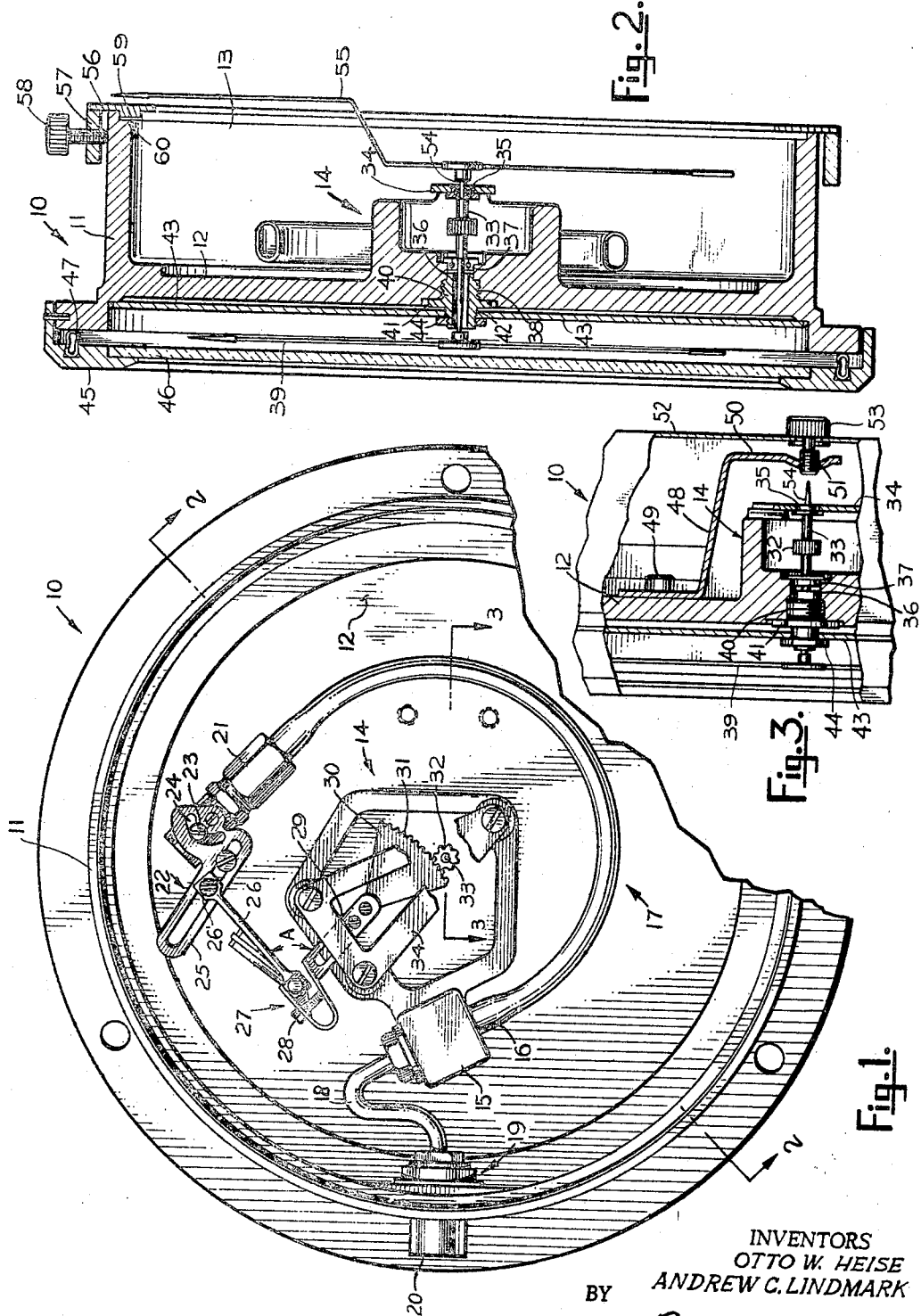

3,398,583
GAUGE DEVICE WITH EXPLOSION-
PROOF CASE
Otto W. Heise, Newtown, and Andrew C. Lindmark, Bridgeport, Conn., assignors to Heise Bourdon Tube Company, Inc., Newtown, Conn.
Filed Feb. 25, 1966, Ser. No. 530,137
9 Claims. (Cl. 73—416)

ABSTRACT OF THE DISCLOSURE

A dial indicator gauge having a sturdy, explosion-proof unitary case incorporating integral side walls extending rearward from the edge of a rigid front wall whose central portion is substantially thickened inwardly to form a sturdy boss raised above the surrounding internal surface of the front face to provide rigid support for the gauge movement mechanism, and also providing precise coaxial alignment of a pointer spindle and a cooperating front dial overlying the front surface of the front wall. In one embodiment, the device is provided with convenient rear access for auxiliary indicating means actuated by the pointer spindle such as a potentiometer or an auxiliary rear pointer and cooperating auxiliary rear dial.

---

This invention relates to pressure gauges, and particularly to an improved pressure gauge of the Bourdon tube type.

It has been common practice to provide the case of a Bourdon tube gauge with an open front face and a closed back face. Adjustments to the linkage of the movement for the gauge required removal of the bezel, the glass window, the pointer and the dial in order to uncover the movement mechanism. This required adjusting the mechanism without reference to the dial and pointer unless a special cutaway dial was substituted.

The principal object of the present invention is to provide a Bourdon tube pressure gauge constructed in a manner permitting adjustment of the linkage comprising the movement mechanism of the gauge without removal of the bezel, window, dial and pointer.

Another object of the invention is to provide such a Bourdon tube gauge in which the pointer spindle extends rearwardly to a position where an auxiliary pointer may be attached to it.

Still another object of the invention is to provide such a Bourdon tube gauge in which a concentric auxiliary dial may be attached to the back of the gauge in a manner to register with the auxiliary pointer attached to the rear end of the pointer spindle.

Still another object of the invention is to provide such a Bourdon tube gauge in which the housing has an explosion-proof solid front wall integral with the sidewall, with a "blow-out" back closed by a removable, flexible closure disk.

In one aspect of the invention, a Bourdon tube gauge may comprise a housing including a tubular sidewall having an integral front face and an open back.

In another aspect of the invention, a movement support may extend inward from the rear of the front face of the case.

In another aspect of the invention, a bearing plate may be attached to the housing and it may include a hole that is aligned with a corresponding hole in the movement support, in each of which holes an antifriction bearing is located.

In a further aspect of the invention, a pointer spindle may be mounted within the antifriction bearings and it may extend through a sleeve fitting mounted within a threaded hole in the center of the front face of the case, and on the forward end of such fitting, the gauge dial is adapted to be mounted in precise concentric alignment with the pointer spindle.

In a still further aspect of the invention, the Bourdon tube may be connected to an outlet socket that is integral with the support, and an outlet tube may connect the opposite end of the socket to an outlet fitting extending through the sidewall of the case.

In a still further aspect of the invention, the vent end of the Bourdon tube opposite that connected to the outlet socket includes the usual linkage mechanism for driving a toothed quadrant that is pivotally mounted between the bearing plate and the main casting. The usual adjustments are provided in this linkage for compensating for errors in linearity and range.

In another aspect of the invention, a removable, flexible back cover plate may be secured to the housing, or case.

In another aspect of the invention, the pointer spindle may extend rearwardly beyond the rear bearing so that an auxiliary pointer can be mounted on the rear end of the spindle.

In a still further aspect of the invention, an auxiliary dial may be attached to the rear of the case when the cover has been removed, and in such fashion that the auxiliary pointer attached to the rear end of the pointer spindle cooperates with the auxiliary dial on the rear of the case.

The above, other objects and novel features of the invention will become apparent from the following specification and accompanying drawings which are merely exemplary.

In the drawing:

FIGURE 1 is a rear elevational view of a Bourdon tube gauge incorporating the invention with the back cover plate having been removed to show the interior of the gauge;

FIGURE 2 is a cross-sectional view taken substantially along line 2—2 of FIGURE 1; and FIGURE 3 is a similar, fragmentary cross-sectional view taken substantially along line 3—3 of FIGURE 1.

Referring to the drawing, the principles of the invention are shown as applied to a Bourdon tube gauge including a case 10 comprising a tubular side wall 11 having an integral front wall 12. The case 10 is open at its back portion 13. The front wall 12 of the case 10 has integrally formed therewith or fixed thereto an inwardly protruding movement support 14 of generally pentagonal form. Beside one leg of the support 14, a socket 15 may be provided. Socket 15 is adapted to have connected to it one fixed outlet end 16 of a Bourdon tube 17. An outlet tube 18 may have its one end connected to the socket 15 and its opposite end connected to an outlet fitting 19 extending through sidewall 11 of the case 10. The outlet fitting 19 may include a threaded aperture 20 adapted to be connected to a conduit carrying liquid or gas to be admitted to the Bourdon tube 17.

The vent end of the Bourdon tube 17 opposite that connected to socket 15 is provided with the usual fitting 21 connecting this vent end of the Bourdon tube 17 to an end piece assembly 22. The end piece assembly 22 is adjustably connected to the fitting 21 through an adjusting screw 23 that extends through an arcuate slot 24 in the assembly 22.

The assembly 22 also includes a slotted link 25 that is connected to one end of a link 26. The opposite end of link 26 is connected to a slide assembly 27 having an adjusting screw 28. Slide assembly 27 includes a slide 29 that is adjustably connected to a quadrant or gear sector 30. The teeth 31 of gear sector 30 mesh with a pinion 32 that is integral with a spindle 33. A bearing plate 34 is mounted on top of the support 14 and supports an antifriction bearing 35 that journals one end of the spindle 33. Support 14 also includes a cylindrical bore 36 aligned with the bearing 35, and this supports another antifriction bearing 37 that journals the other end of the spindle 33.

Bore 36 opens into and is concentric with a threaded hole passing through front wall 12 of case 10. A sleeve fitting 40 is threaded into the threaded opening 38 in the front wall 12 and includes a flange 41 limiting its inward motion. One end of the fitting 40 precisely fits into the cylindrical bore 36 within the support 14, adjacent to the spindle bearing 37. At its opposite end, a concentric cylindrical surface 42 of sleeve fitting 40 concentrically supports a dial 43, which is held in place on fitting 40 by a nut 44. The front end of spindle 33 extends forwardly through the hollow sleeve fitting 40 beyond dial 43, and a pointer 39 is mounted on the front end of spindle 33.

A bezel 45 supports a window 46 and a hollow flexible tubular seal 47 of pliable plastic-like material is compressibly deformed between the case 10 and the bezel 45.

While movement support 14 may be cast integrally with housing 10 or separately formed and firmly anchored thereto, in either case it forms a sturdy integral supporting base for the movement and Bourdon tube 17. The sleeve fitting 40, extending through support 14 and front wall 12, assures high-precision concentric positioning of dial 43, pointer 39 and its spindle 33, since fitting 40 supports all of these concentric components. Minor eccentricities of the rim of housing 10, or bezel 45 thus have no effect upon the accuracy of the gauges of this invention.

Referring to FIGURE 3, an offset bracket 48 has its one end fixed by a screw 49 to the front wall 12 of case 10. Another offset leg 50 of bracket 48 that is parallel with the leg that is fixed to the front face 12 includes a threaded opening 51. If desired, bracket 48 may be mounted directly on the support 14, rearwardly spanning the rear end of pointer spindle 33.

A relatively thin, flexible disk 52 may have a screw 53 secured through its center portion and adapted to be threaded into the threaded opening 51 in leg 50 of bracket 48 in order to provide a rear closure for the case 10. Disk 52 may be formed of any stiff, flexible material such as stainless steel, for example. In the event that excessive pressure caused by leakage or rupture of pressure conduit 18 or tube 17 occurs within case 10, the outer edges of the relatively thin disk 52 flex outwardly, relieving such pressure and thereby minimizing damage to the movement mechanism of the gauge within the case 10. Furthermore, in the event that the gauge is employed for high pressure measurements, and the tube 17 for any reason should break, the solid, integral front face 12 prevents injury to anyone observing the gauge, and the pressure merely flexes the back cover disk 52 outwardly, thereby protecting anyone who is in front of the gauge.

When is is desired to make adjustments for linearity, the angle A between the link 26 and the slide 29 must be adjusted, as indicated in FIGURE 1. This is done by loosening the link screw 26' anchoring link 26 to slotted link 25, and moving the end of the link 26 thereby connected to the slotted link 25 along the slot therein. Furthermore, when range adjustment is necessary, the screw 28 is required to be adjusted.

Heretofore, when the gauge case was open at the front and closed by a solid wall at the back, it was necessary to remove the bezel 45, with window 46, the pointer 39 and the dial 43 before suitable adjustments could be made for linearity and range. In the pressure gauges of the present invention, having a solid front wall 12 and an open back 13, the screw 53 may be removed from the threaded opening 51, thereby removing the back disk 52, providing convenient access for adjustment of the movement without removing dial 43 or pointer 39.

One of the major features of the present invention is the fact that the spindle 33 has a rear extension 54 adapted to support auxiliary indicating means such as a potentiometer, transducer, remote readout device, or the auxiliary pointer 55 shown in FIGURE 2 including an offset portion adapted to extend outwardly beyond the rear end of the case 10. An auxiliary annular dial 56 may be mounted on the back of case 10 by an suitable means, and in the embodiment disclosed it is attached to a ring 57 that fits on the outer periphery of the wall 11 and is held thereto by a set screw 58. The auxiliary dial 56 may be cut away so that only a graduated rim portion of the dial is available to be observed with the offset portion of the pointer 55. Accordingly, pointer 55 will be capable of cooperating with the auxiliary dial 56. With auxiliary dial 56 attached to the back of case 10 and the auxiliary pointer attached to the rear extension 54 of spindle 33, adjustments for linearity and range can be made with precision without reference to the pointer 39 on the front of the gauge.

Protruding inwardly from dial 56 are these radial positioning points 59 seating in a bored step-recess 60 formed at the inner rear edge of sidewall 11, which forms a cylindrical seat concentric with spindle 33 accommodating blowout back disk 52 or dial 56.

The auxiliary dial need not be a separate removable component. If desired, a scale or reference marks may be marked or engraved directly onto the rear rim of case sidewall 11 for use with auxiliary pointer 55.

While the objects of the invention are efficiently achieved by the preferred forms of the invention described in the foregoing specification, the invention also includes changes and variations falling within and between the definitions of the following claims.

We claim:

1. A gauge comprising in combination, a unitary case incorporating a tubular sidewall and a solid front wall integral therewith, the back of the case being open to provide rear access to the interior of the case, an integral support protruding rearwardly from the rear face of the front wall of the case, and formed by a substantially thickened boss portion of the front wall of the case raised inwardly from said rear face and forming a sturdy rigid anchor for a gauge movement mechanism, means forming a unitary central aperture extending through the front wall and the support, first spindle bearing means mounted at the inner end of the central aperture and rotatably supporting a pointer spindle, a sleeve fitting mounted in the central aperture aligned with and adjacent to the first spindle bearing means and having (A) a central bore through which the front end of the pointer spindle protrudes beyond the front wall
(B) and a cylindrical dial-supporting surface concentric with the central aperture in which the sleeve fitting is mounted, a front dial concentrically supported by the dial-supporting surface, a pointer mounted on the protruding front end of the pointer spindle for juxtaposed observation with the front dial, and a movement mechanism responsive to condition variations for turning the pointer spindle anchored to the substantially thickened boss support portion of the front wall inside the case in operative engagement with the pointer spindle extending through the unitary central aperture in the support boss and integral front wall.

2. The gauge defined in claim 1 including a removable blow-out disk spanning the open back of the case to provide a protective cover for its interior, and means removably securing the disk to the case.

3. The combination defined in claim 2 wherein the securing means includes a captive screw rotatably held in an aperture in the blow-out disk, and a bracket mounted on the inside of the case and having means therein forming a threaded aperture aligned for removable engagement by the captive screw when the disk is positioned spanning the open back of the case.

4. The combination defined in claim 1 wherein the support incorporates second spindle bearing means axially spaced rearwardly from the first bearing means, with the pointer spindle having a free rear end axially extending rearwardly beyond the second bearing means and adapted to support auxiliary indicating means.

5. The combination defined in claim 4 wherein the indicating means includes an auxiliary pointer removably secured to the spindle's free end.

6. The combination defined in claim 5 wherein the indicating means includes an auxiliary dial positioned at the back of the case aligned for juxtaposed observation with the auxiliary pointer.

7. The combination defined in claim 1 wherein the case is provided with a peripheral front bezel positioning a transparent window spanning the front dial and pointer, and wherein the rear recess for adjustment of the movement mechanism provided by the open back of the case permits range and calibration adjustment thereof without disturbing the bezel, window pointer or front dial.

8. The combination defined in claim 1 wherein the support anchors clamping means anchoring an outlet end of a Bourdon tube whose opposite vent end is connected to actuate the movement mechanism in response to pressure variations occurring in a pressure fluid introduced into the interior of the Bourdon tube.

9. The combination defined in claim 6 wherein the auxiliary dial is removably secured to the case.

References Cited

UNITED STATES PATENTS

| | | | |
|---|---|---|---|
| 2,191,533 | 2/1940 | Knobloch | 73—411 |
| 2,918,819 | 12/1959 | Freeman | 73—415 |
| 3,141,335 | 7/1964 | Smith | 73—416 |
| 3,201,992 | 8/1965 | Hoff | 73—431 |

DAVID SCHONBERG, *Primary Examiner.*

DENIS E. CORR, *Assistant Examiner.*

UNITED STATES PATENT OFFICE
CERTIFICATE OF CORRECTION

Patent No. 3,398,583 August 27, 1968

Otto W. Heise et al.

It is certified that error appears in the above identified patent and that said Letters Patent are hereby corrected as shown below:

Column 5, line 17, "recess" should read -- access --.

Signed and sealed this 10th day of February 1970.

(SEAL)
Attest:

Edward M. Fletcher, Jr.
Attesting Officer

WILLIAM E. SCHUYLER, JR.
Commissioner of Patents